United States Patent [19]
Dalton

[11] 3,726,192
[45] Apr. 10, 1973

[54] PHOTOGRAPHIC CAMERA

[75] Inventor: Robert L. Dalton, Pittsford, N.Y.

[73] Assignee: R. D. Products, Inc., Farmington, N.Y.

[22] Filed: Mar. 24, 1971

[21] Appl. No.: 127,608

[52] U.S. Cl. ................................95/1.1, 95/18
[51] Int. Cl. ...................................G03b 17/24
[58] Field of Search ..............95/1.1, 18; 355/26

[56] References Cited

UNITED STATES PATENTS

| | | | |
|---|---|---|---|
| 1,143,521 | 6/1915 | Faber | 95/1.1 X |
| 1,972,973 | 9/1934 | Bauer | 355/26 X |
| 2,871,088 | 1/1959 | Abell | 95/1.1 X |
| 2,896,522 | 7/1959 | Stein | 95/1.1 |
| 3,111,887 | 11/1963 | Alexander | 95/1.1 |

Primary Examiner—John M. Horan
Attorney—Shlesinger, Fitzsimmons & Shlesinger

[57] ABSTRACT

With this camera a photograph of an individual and of a card bearing identifying data concerning that individual are taken simultaneously on a film frame. A two-lens system is used in the camera. One lens is the usual front lens of a camera and is focused on the subject. The other lens is mounted intermediate front and back of the camera and is focused on the data card which is inserted in the rear of the camera. Separate shutters for the two lenses are opened simultaneously; and the image of the data card is reflected by a mirror onto a semi-transparent mirror which transmits that image onto the film frame while the image of the subject is transmitted by this same semi-transparent mirror onto a portion of the same film frame.

4 Claims, 4 Drawing Figures

PATENTED APR 10 1973 3,726,192

INVENTOR.
ROBERT L. DALTON

BY

ATTORNEYS

PHOTOGRAPHIC CAMERA

The present invention relates to cameras for making identification cards such as are used by corporation employees, bank depositors, state motor and gun licensing bureaus, etc.

Heretofore most identification cards have been produced by gluing or photographing an individual's picture onto a blank identification card, and thereafter typing on the card pertinent descriptive data as to the individual, such as his name, address, account number, etc. Usually this card is signed by the individual after his or her photograph has been mounted thereon. In any case, the information added to such a card can be altered by erasure, ink eradication, or the like.

In my U.S. Pat. No. 3,547,015, issued Dec. 15, 1970, I have disclosed a camera in which a transparency bearing intelligence identifying the individual whose picture is to be taken is pressed into direct contact with a film frame; and both the individual, whose identification card is being made, and the intelligence on the transparency are photographed simultaneously on the film frame. The film frame may itself be used as the I.D. card after being mounted, for instance, on a clear plastic backing or sandwiched in a clear plastic mounting, or a print can be made of the film frame, and this print mounted on clear plastic, to constitute the I.D. card. Thus, drivers' licenses, employee I.D. cards, etc. can be made up quickly and cheaply and without fear of alteration.

In many cases, however, it is desirable to use a card bearing the intelligence or information identifying an individual instead of a transparency in making an I.D. card.

The primary object of this invention, therefore, is to provide a camera in which cards bearing identifying data may be photographed simultaneously with the individual to whom the card refers, thereby to produce a picture from which an unalterable identification card of that individual may be made.

Another object of the invention is to provide a camera of the character described which is compact and which will lend itself to the making of individual I.D. cards successively for large groups of people.

Other objects of the invention will be apparent hereinafter from the specification and from the recital of the appended claims, particularly when read in conjunction with the accompanying drawings.

Figure 1:
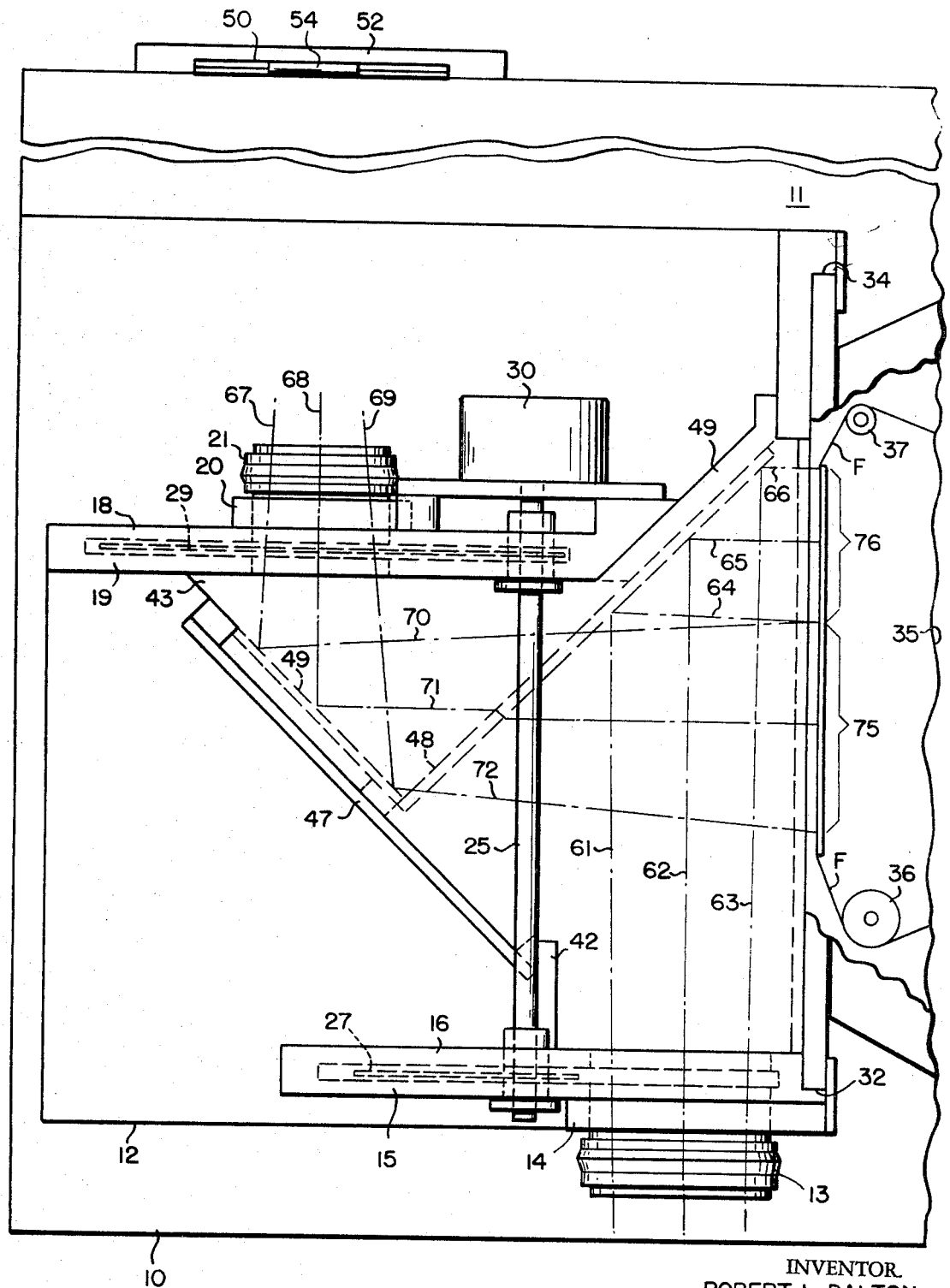
FIG. 1 is a plan view, with parts broken away, of a camera built according to one embodiment of this invention.
Figure 2:
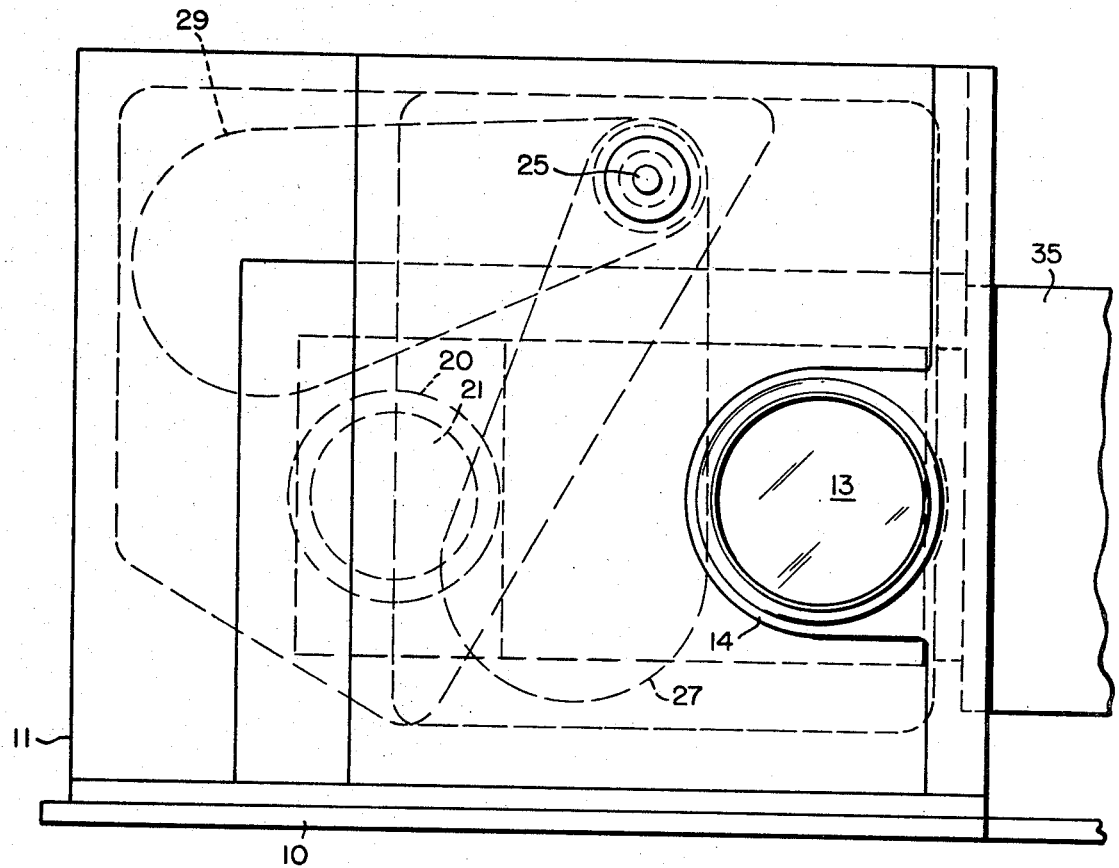
FIG. 2 is a front elevation of this camera, illustrating diagrammatically, also, the relative positions of its two lenses and two shutters.
Figure 3:
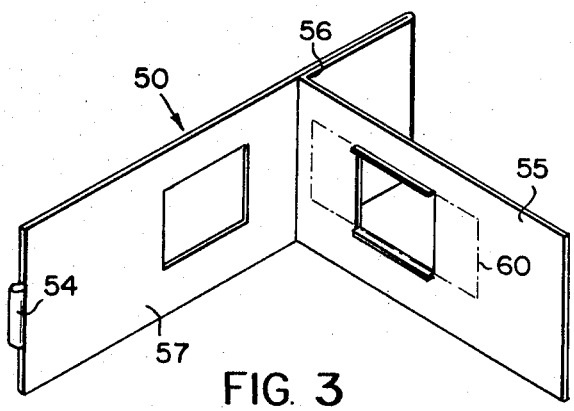
FIG. 3 is a perspective view of one form of card holder which may be employed with this camera.
Figure 4:
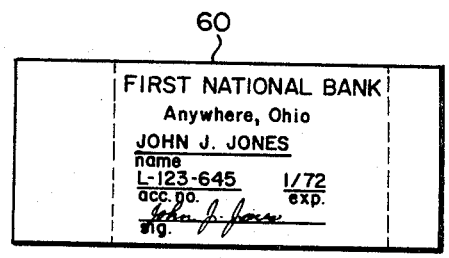
FIG. 4 is a view of a typical data card.

Referring now to the drawings by numerals of reference, 10 denotes the base on which the camera housing 11 is supported. Mounted in the front wall 12 of the housing is a collar 14 in which a suitable lens mount 13 can be threaded. The collar 14 is carried by the front plate 15 of two spaced, parallel plates 15 and 16. Mounted in the rear wall 18 of two spaced, generally parallel plates 18 and 19 is a collar 20 in which a second lens mount 21 is threadable. The two lens mounts are offset from one another; and the two plates 18 and 19 are disposed intermediate the front and rear walls of the camera housing.

Journaled, adjacent its front end in the plates 15 and 16, and, adjacent its rear end in the plates 18 and 19, is a shaft 25. Secured to this shaft to swing in the space between the plates 15 and 16 is a shutter blade 27; and fastened to this shaft to swing in the space between the plates 18 and 19 is a shutter blade 29. The shutter blades, when in open positions, let light simultaneously through the two lens systems of the camera. The shaft is driven by a rotary solenoid 30 which is secured to its rear end and which rotates through an angle of 45°.

The camera housing is provided at one side with guideways 32 and 34 into and out of which a film cartridge or magazine 35, such as shown at 45 in my U.S. Pat. No. 3,547,015 above referred to, may be slid. Mounted in this magazine is a film supply spool from which film F is adapted to be fed around a metering roller 36 across the exposure aperture in one side of the cartridge and around an idler roller 37 to a take-up spool as described in said patent. Clamps 38 hold the cartridge securely in place. A resilient pressure plate 39 in the cartridge overlies the opening in the side of the cartridge and holds a frame of the film in the exposure plane of the camera.

Welded or brazed or otherwise secured to spaced ledges 42 and 43 to extend across the whole width of the camera in an inclined position relative to the axes of shaft 25 and of the front and rear lenses is a light-tight plate 45, on which there is mounted an inclined rearwardly-facing reflecting mirror 47. Mounted in this chamber at an angle of 90° to mirror 47 is a second inclined mirror 48 supported from guide 34 by a bracket 49. The mirror 48 is semi-transparent and has approximately 65 percent reflectance and 35 percent transmission. It is mounted at an angle of 45° to the exposure plane of the camera.

The card, which contains an individual's identifying data, is adapted to be placed in a holder 50, which is adapted to be slid into and out of a guide 52 in the camera housing. This holder is similar to that shown at 30 in my U.S. Pat. No. 3,547,015 and has a handle 54 at one side by means of which it is insertable into and removable from the camera. It may comprise an apertured door or cover 55 hinged at 56 to base plate 57. The data card 60 is placed between the ledges 58 on the door or cover 55 in registry with the aperture 59 in the base plate 57.

The holder 50 is adapted to locate the data card 60 in optical registry with the rear lens 21. When the shutters are opened, light will pass from lens 13 along lines 61, 62, 63 and 65% of this light will be reflected by mirror 48 along lines 64, 65, 66 to the film plane to photograph onto the film F a picture of the individual whose identification card is being made. At the same time, the image of the data on the data card will be transmitted through lens 21 along lines 67, 68, 69, and be reflected by mirror 49 along lines 70, 71, 72 through semi-transparent mirror 48 and be photographed onto the film. In the instance shown, then, the photographed data will occupy the area 75 of the film, while the image of the individual himself will be photographed on the area 76 of the film frame.

The camera may be wired in substantially the same way as the camera of U.S. Pat. No. 3,547,015, and the circuit need not, therefore, be described here.

To use the camera, a card holder 50 with an individual's data card mounted therein, is inserted into the camera until its handle 54 trips a switch to illuminate the viewfinder (not shown) of the camera, which may be of conventional construction. The camera is focused on the person whose I.D. card is to be made. A manually-operated switch (not shown) is then actuated. This energizes a relay which causes the rotary solenoid 30 to be energized momentarily. This rotates shaft 25 to move the shutters 27 and 29 out of registry with the front and rear lenses of the camera. When the shutters reach fully-open position, a switch is closed which causes a surge of power through the primary of a transformer, and the secondary of the transformer triggers a flash lamp mounted on the camera. The image of the person being photographed is reflected by semitransparent mirror 48 onto the film frame then in the exposure aperture of the magazine 35; and simultaneously the image of the data on the data card in the card holder 50 passes through the transparent mirror 48 and is photographed on this film frame. Thus a picture is produced on the film of the data and of the person to whom the data applies.

After the exposure, a time delay relay reverses its switch, the exposed frame of film is moved out of registry with the exposure aperture of the camera, and a new unexposed frame of film is brought into registry with this aperture in a manner such as described in U.S. Pat. No. 3,547,015.

From the preceding description, it will be apparent that with the camera described both a person and his or her identifying data are photographed simultaneously on a film frame. This absolutely prevents alteration of the I.D. card printed from the exposed film frame. The position of the individual's photograph on the film frame and on the I.D. card is determined by the positions of the apertures in the data card holder and by the relative locations of the camera lenses and mirrors. Thus, an individual can be photographed on the I.D. card so that his picture will extend over part or all of the identifying data as desired.

While the invention has been described in connection with a specific embodiment thereof, it will be understood that it is capable of further modification, and this application is intended to cover any embodiments of the invention that fall within its scope or the limits of the appended claims.

Having thus described my invention, what I claim is:

1. A camera for making identification cards containing a photograph of an individual and data identifying that individual, comprising
  a housing,
  means for holding photosensitive material in registry with an exposure aperture formed inside said housing,
  a first lens mounted in said housing at the front thereof for admitting light from the outside into said housing and directing it onto the photosensitive material to photograph an individual onto the photosensitive material,
  means for holding inside said housing at the rear thereof a card containing data identifying the individual,
  a second lens mounted in said housing intermediate the front and rear thereof with its axis parallel to but offset from the axis of said first lens and optically aligned with said data card holding means and with a data card therein,
  means for directing light and an image of said data card from said second lens onto the photosensitive material,
  two shutters movably mounted in said housing between the two lenses and the photosensitive material for rotation about a common axis, and
  means for opening the two shutters simultaneously to photograph an individual and the data on a data card identifying that individual simultaneously on the photosensitive material.

2. A camera as claimed in claim 1, wherein the means for transmitting the light comprises a semitransparent mirror positioned in said housing to transmit light from both said first lens and said second lens onto the photosensitive material.

3. A camera as claimed in claim 2 wherein the means for photographing the data from the data card onto the photosensitive material also includes a mirror positioned at right angles to said semi-transparent mirror and inclined at an angle of 45° to the axis of said second lens, and said semi-transparent mirror is mounted in said housing at an angle of 45° to the axis of said first lens and also at an angle of 45° to the exposure plane of the camera.

4. A camera for making identification cards containing a photograph of an individual and data identifying that individual, comprising
  a housing,
  means for holding photosensitive material in registry with an exposure aperture formed inside said housing,
  a first lens mounted in said housing at the front thereof for admitting light from the outside into said housing and directing it onto the photosensitive material to photograph an individual onto the photosensitive material,
  means for holding inside said housing at the rear thereof a card containing data identifying the individual,
  a second lens mounted in said housing intermediate the front and rear thereof and optically aligned with said data card holding means and with a data card therein,
  means for directing light and an image of said data card from said second lens onto the photosensitive material,
  two shutters movably mounted in said housing between the two lenses and the photosensitive material, and
  means for opening the two shutters simultaneously to photograph an individual and the data on a data card identifying that individual simultaneously on the photosensitive material,
  the means for photographing the data from the data card onto the photosensitive material also including a mirror positioned at right angles to said semi-transparent mirror and inclined at an angle of 45° to the axis of said second lens, and said semi-transparent mirror being mounted in said housing at an angle of 45° to the axis of said first lens and also at an angle of 45° to the exposure plane of the camera, the two lenses being mounted with their axes offset but parallel to one another, and the two shutters being secured to a common shaft whose axis is parallel to the axes of the two lenses but is intermediate those two axes.

* * * * *